Dec. 2, 1941.   C. C. HERITAGE   2,264,976
THERMAL INSULATION
Filed Aug. 3, 1938
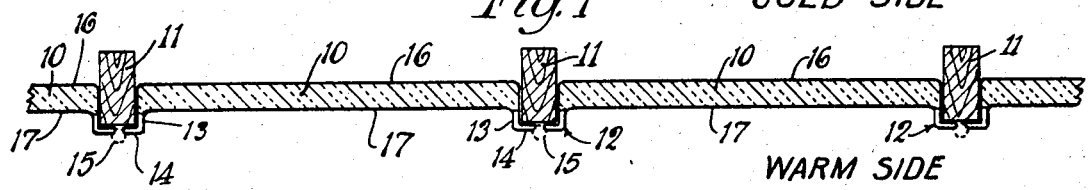
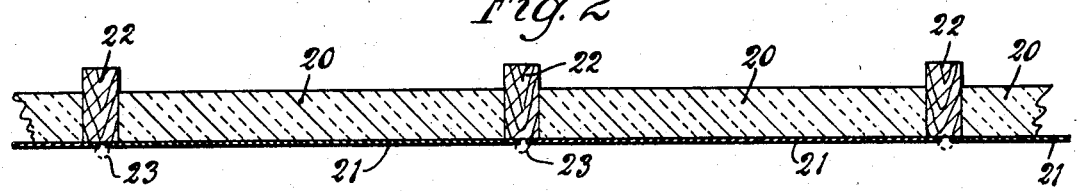
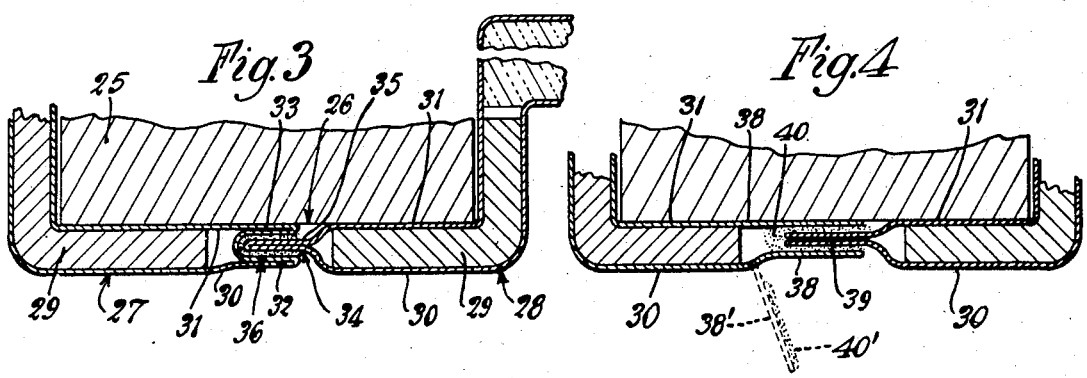
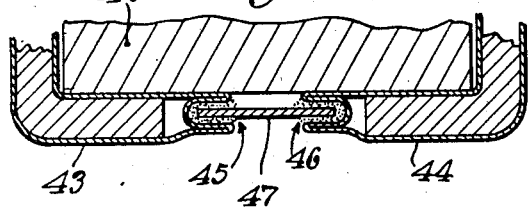
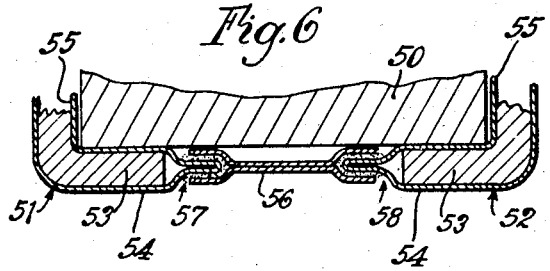
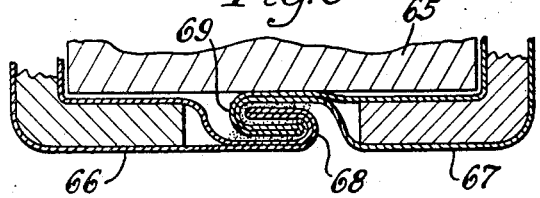
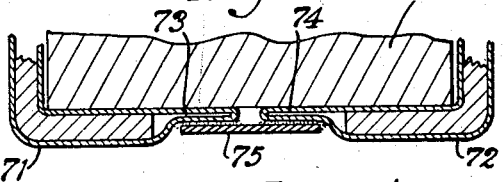
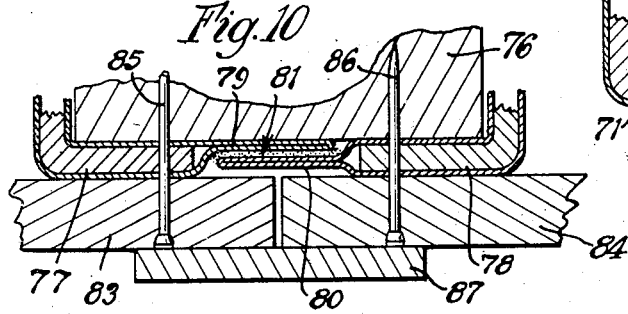
Inventor
Clark C. Heritage
by W. Bartlett Jr.
Attorney.

Patented Dec. 2, 1941

2,264,976

UNITED STATES PATENT OFFICE 2,264,976

THERMAL INSULATION

Clark C. Heritage, Cloquet, Minn., assignor to Wood Conversion Company, Cloquet, Minn., a corporation of Delaware Application August 3, 1938, Serial No. 222,738

4 Claims. (Cl. 20—4)

The present invention relates to insulation and insulated walls, having particular reference to structure for uniting adjacent strips of insulation into a tight joint to provide a well-sealed insulated wall.

The invention has particular application to building walls or the like wherein there are parallel spaced supports or studs, between which strips of insulation are mounted. One manner of mounting such strips heretofore has provided at least a portion of mounting flanges of the insulation on the face of the studs, each stud-face having the edges of opposed flanges spaced apart. Ordinarily, these portions of the flanges are secured to the face directly, or indirectly by mounting wall board or a plaster base over the flanges. Because spaced points of attachment along the flange have been used, there have been left open spaces or vents through which air moves. Movement of air, particularly from the warm side to the cold side of the insulation by way of these cracks, openings or vents, may be serious where conditions create condensation of moisture. In warm air, the moisture content is high, and this is particularly so in air-conditioned rooms in winter. This moist warm air moving to the cold side becomes chilled and moisture is deposited as free water. This water may run elsewhere, soak the structure or even the insulation, and continue to collect and do damage before it may dry out. And it may never dry out of certain constructions producing rot or other damage. Furthermore, this free water may freeze and gradually accumulate ice. This may also create trouble in numerous ways. Particularly it may collect and fall, perhaps breaking insulation by sheer weight.

It is therefore of great value to provide a wall, and insulation for a wall, which avoids these dangers. The present invention provides for an ultimate continuous structure across the face of a stud from flange to flange.

A particular object of the invention is to provide insulation which in mounting creates the desired seal with or without auxiliary means associated therewith.

Various other and ancillary objects and advantages of the invention will appear from the description and explanation of the preferred forms of the invention shown in the accompanying drawing in which:

Fig. 1 represents one insulating structure wherein the invention may be used.

Fig. 2 is another type of insulating structure wherein the invention may be used.

Figs. 3, 4, 5, 6, 8 and 9 are detailed structures illustrating the invention as applied to a structure according to Fig. 1.

Fig. 7 is a detailed view of one sealing means for use in a structure like that of Fig. 6.

Fig. 10 is another detailed view of a structure according to the invention, additionally representing an application over the studs on the warm side of a wall.

Fig. 1 represents a wall having the preferred type of insulation 10 whether rigid or flexible, mounted on studs 11 by angular flanges 12 which have a portion 13 on the side of the stud and a portion 14 on the face of the stud. Thus the insulation has its face inwardly from the face of the studs. The dotted circles 15 are diagrammatic to represent the detailed structures later described. It is of course to be understood that the insulation itself may be or have a seal against passage of air directly through the insulation between studs. Preferably, both faces of the insulation 10 have water-proof or moisture-vaporproof and air-tight liners, as of paper 16 and 17, which in the preferred form is an asphalted creped paper, so as to yield without rupture, in handling, mounting, and in settling of the structure.

Fig. 2 represents what may be rigid or flexible insulation. For example, rigid mineral-fiber bats 20 are shown, which have a liner 21 of air-tight paper, which is also desirably water-proof, and moisture-vapor-proof. Liner 21 extends laterally to provide flanges on the face of the studs 22. These flanges need not be mounting flanges, for such bats can be placed without necessarily securing the flange to the studs. The dotted circles 23 are diagrammatic to represent the detailed uniting structures described below. The insulation 20 is shown with a space behind it, but it is to be understood that it may be the "wall thick" variety which completely fills the space between the finishing structures on the studs. This type is extremely subject to damage by condensed moisture, as there is no ventilating space.

In Fig. 3, a stud 25 is shown with face 26 whereon the seal is formed. Two flanges 27 and 28 lie on the face 26. Each flange is shown as an angular flange, described for Fig. 1, having a reinforcing angular strip 29, as of scored chipboard, enclosed within liners 30 and 31 on its opposite faces. The liners may be paper, as for example, extended portions of the liners 16 and 17 of the insulation in Fig. 1. Liners 30 and 31 may be one continuous piece as shown in Fig. 3.

In Fig. 3 these liners terminate in a cooperative manner to effect the seal, one to the other. The continuous liner 30—31 on one flange 27 is folded in to provide two lips 32 and 33 defining a "groove" 34, for receipt of "tongue" 35, formed by a flat fold in the continuous liner 30—31 of the other flange 28. In mounting, the tongue and groove union is completed preferably in the presence of a sealing material such as asphalt 36. The groove 34 may contain soft asphalt or plastic adhesive, such as to permit pulling the lips apart for insertion of the tongue 35.

It is noted that the true dimensions of the flange parts, relative to the stud, are exaggerated merely for the purpose of illustration. This holds true for all of the illustrations. The angular flange with reinforcement is more particularly described in the copending application of Edwin W. Davis, Serial No. 221,068, filed July 25, 1938.

In Fig. 4 the respective liners 30 and 31 are separate, and the ends 38 of one set merely include the ends 39 of the opposite flange. Sealing material 40 is shown. This may be carried between the liners as described above for groove 34. The dotted line 38' represents one flap folded out, with adhesive 40' exposed on opening the strip to be folded in onto liner ends 39 when the two flanges are united.

Fig. 5 represents a modified structure in which a stud 42 has two flanges 43 and 44 of the "groove" types above described. They present the "grooves" 45 and 46 into which fits a single strip or "double-edged-tongue" 47. Adhesive may be used as shown.

Fig. 6 shows a modified form in which a stud 50 has two flanges 51 and 52 each of the "tongue" type. These have reinforcing members 53 extending not quite to the edge of the tongue inside liners 54 and 55, so that the edge is thin. An auxiliary double-edged "groove" element is provided in the form of a strip 56 presenting edge grooves 57 and 58 by suitable structure. Fig. 7 shows such a convenient tongue-strip comprising two strips of material 59 and 60, which may be secured together near their centers. This may be done by staples 61 securing both strips to the stud.

The forms of Figs. 4, 5 and 6 provide two like flanges for a strip of insulation, and are preferred to a form like Fig. 3 wherein two types of flange are required. Still another type having different flanges is shown in Fig. 8. Stud 65 has flanges 66 and 67 with clinching end folds. The edge of flange 66 is turned in and under as shown at 68, while the edge of flange 67 is turned out and over as shown at 69, the parts clinching as shown. Sealing adhesive is preferably used in the joint to perfect the seal.

A particular advantage of the flanges comprising the thicker reinforcing strip covered by one or two liners, the reinforcing strips terminating short of the edge line of the flange, lies in the fact that the sealed joint is at least not thicker, and preferably thinner, than the reinforced area of the flange. There is thus no bulging central line along the face of the studs as a result of the new construction. It is also to be understood that in the form of Fig. 4, the thinner edges of one flange may be lapped entirely over the thinner edges of the other flange, without the "tongue and groove" union, or one liner of each flange may fit between the two liners of the other flange.

The invention may be employed in other forms such as in Fig. 9 and Fig. 10. In Fig. 9 a stud 70 has flanges 71 and 72, each with thin edges 73 and 74, each not over half the greater thickness, which edges do not reach to each other. A sealing tape 75 is placed to form the joint or seal over the thin edges but not over the thicker portions.

In Fig. 10, the stud 76 receives flanges 77 and 78 with thin edges 79 and 80, each not over half the greater thickness of the flange portion of the stud face. The flanges are long enough for only the thinner edges to overlap, with intervening adhesive 81.

In Fig. 10 wall board or plaster-base is shown mounted over the flanges lying on the face of stud 76. It is common to make a joint in these materials over the center of the stud face, particularly with wall board. Two sections 83 and 84 of such material are shown so joined, and nailed to the stud by nails 85 and 86, with the joint covered by beading 87 or other strip material. Flush joint constructions are also contemplated. The nailing is located laterally of the stud-face center, coming over the thicker part of the flange. A bulge-line or raised strip resulting from the sealing construction of the present invention would create an imperfection in a wall of this type. Where lath and plaster are used the defect would not be serious. Reference to Fig. 10 shows that if the line of sealing projected beyond the plane of the flanges at the nailing zone, the meeting edges of the boards would be forced out.

The present invention is characterized by the securing of one flange to the other, directly, or indirectly by connecting sealing material, carried by the flange or apart therefrom, whereby the seal or structure is continuous and independent of the stud. It is to be distinguished from constructions wherein each flange is cemented to the stud, or opposing spaced flanges are connected together by sealing substance such as asphalt united to the flanges and also to the stud. Herein where the term "strip-like means" is used to designate the sealing element, it is to be understood that it may be integral with a flange, attached initially to a flange, or separate from a flange.

The present invention makes an excellent element for an insulated wall when carrying out the invention of the Weyerhaeuser-Busch U. S. Patent No. 2,030,668.

It is readily seen that any of the detailed structures described may be used where the dotted circles 15 and 23 appear respectively in Figs. 1 and 2.

It is noted that in Fig. 1 the liner 17, as the warm side liner is little exposed to moisture or water. But liner 16 should protect the insulation on the cold side from condensation of any moisture which may have moved from the room into the cold side of the wall. Therefore, the particular liner 16 is preferred to be of water-proof material, regardless of what material liner 17 may be. In a structure like Fig. 2, the insulation is open to receive moisture condensing from air leaking in around the stud (in cases needing the present invention). Ice may readily accumulate on the cold face of the insulation. As it gets heavy it is free to drop down in the residual space illustrated. This gradually destroys the insulation. The only remedy is avoidance of the conditions, and the present invention provides a simple and convenient way to help in the avoidance. The sealing need not be, and practically is never perfect with ordinary expense and workmanship. But slight accumulation of moisture is permissible where the remainder of the construction is such as to permit drying out. However, closeness to perfection is the goal to be sought, because wet insulation ceases to insulate. Therefore, sealed insulation, as shown in Fig. 1 is the preferred form.

Various modifications and applications of the invention will occur to those skilled in the art without departing from the spirit and scope of the invention as expressed in the appended claims.

I claim:

1. A wall or ceiling structure comprising a series of spaced parallel supports which define a partition between a cold atmosphere and a warm humid atmosphere, thermal insulation bodies between said supports inwardly of the warm-side wall forming faces of said supports, an air-sealing membrane over the warm side of said insulation, said membrane extending on each side to provide at least a part of a flange and lying at least in part over a warm-side face of a support, a flange carried by each insulation body including reinforcing material to thicken the flange, said reinforcing material being absent at an edge portion of the flange whereby there is provided a relatively thick portion of the flange and a relatively thin edge portion, said two portions including said membrane, the said flanges over a single support being directed toward each other with a space between the thick portions of the flanges, and means including sealing adhesive to seal the opposing extensions together, said ahesive being contained in the sealed joint as an interfacial layer independent of the face of a support, whereby the membranes of adjacent insulation bodies are connected together in an air-tight seal across the face of a support independently of said support.

2. A wall or ceiling structure comprising a series of spaced parallel supports which define a partition between a cold atmosphere and a warm humid atmosphere, thermal insulation bodies between said supports inwardly of the warm-side wall-forming faces of said supports, an air-sealing membrane over the warm side of said insulation, said membrane extending on each side to provide at least a part of a flange and lying at least in part over a warm side face of a support, a flange carried by each insulation body including reinforcing material to thicken the flange, said reinforcing material being absent at an edge portion of the flange whereby there is provided a relatively thick portion of the flange and a relatively thin edge portion, said two portions including said membrane, the said flanges over a single support being directed toward each other short of an overlapping relation, and means including an independent strip of air-sealing material and sealing adhesive to seal the opposing thin portions together with a joint not thicker than the thick portion of the flange, said adhesive being contained in the sealed joint as an interfacial layer between said strip and the thin portions of the flanges independently of the face of a support, whereby the membranes of adjacent insulation bodies are connected together in an air-tight seal across the face of a support independently of said support.

3. A wall or ceiling structure comprising a series of spaced parallel supports which define partition between a cold atmosphere and a warm humid atmosphere, thermal insulation bodies between said supports inwardly of the warm-side wall-forming faces of said supports, an air-sealing membrane over the warm-side of said insulation, said membrane extending on each side to provide at least a part of a flange and lying at least in part over a warm-side face of a support, a flange carried by each insulation body including reinforcing material to thicken the flange, said reinforcing material being absent at an edge portion of the flange whereby there is provided a relatively thick portion of the flange and a relatively thin edge portion, said two portions including said membrane, the said flanges over a single support being directed toward each other with a space between the thick portions and with the thin portions in an overlapping relation forming a joint not thicker than the thick portion of the flange, and sealing adhesive to seal the opposing thinner portions of the flanges with an overlapping of material providing a union within said space not thicker than the thick portion of the flange, said adhesive being contained in the sealed joint as an interfacial layer between opposing membranes independently of the face of a support, whereby the membranes of adjacent insulation bodies are connected together in an air-tight seal across the face of a support independently of said support.

4. Insulation for a wall structure comprising a strip of relatively thick insulation material adapted to be mounted in the space between parallel rectangular supports, mounting flanges on said insulation at the edges thereof, said flanges being relatively much thinner than the strip of insulation, said flanges having a relatively thick body portion and a relatively thinner edge portion, an air-pervious covering membrane common to the strip of insulation and to said two flange portions, the flanges of a single strip being adapted to be mounted on the faces of two parallel supports between which the strip is mounted, the width of the thick portions of the flanges being such that there is a space between opposing thick portions when mounted on a common support, whereby the thin portions of the flanges may be united by a seal located in said space forming a joint not thicker than the thick portion of the flange, and whereby the two thick portions provide a flat backing for a wall finish.

CLARK C. HERITAGE.